Patented Jan. 2, 1945

2,366,591

UNITED STATES PATENT OFFICE 2,366,591

FRUIT AND VEGETABLE TABLETS

John A. Bruce, Tampa, Fla., assignor to Bruce's Juices, Inc., Tampa, Fla., a corporation of Florida No Drawing. Application March 12, 1942, Serial No. 434,441

5 Claims. (Cl. 99—206)

This invention is concerned with producing a hard tablet condensed from fruit or vegetable juices or extracts and containing food elements in high concentration and particularly vitamin C.

Some ways of preserving fruits and vegetables require rather bulky containers. Commercial practice has been toward fruit or vegetable concentrates that are to be re-formed for consumption or at least diluted. Under this invention the condensed material may be kept in concentrated form and consumed in concentrated form or may be diluted if desired. When reducing fruit or vegetable juices to smallest possible bulk, a problem exists to retain values peculiar to fruits and vegetables. For example such juices are foods that have an alkaline ash; adding sugar or starch simply decreases the alkaline value. Oxidation and other reactions have destroyed desirable ingredients and impaired the flavor, odor and palatability of fruit or vegetable concentrates.

An object of this invention is to obtain certain extracts of fruits or vegetables as a hard product, but to preserve therein various characteristic food values and to obtain desirable flavors.

The present invention will be illustrated by a hard food tablet from citrus fruit, a tablet that contains and retains high vitamin C value and also other food elements of the juice. However, this illustration is not to be regarded as limiting of this invention inasmuch as the invention may be practiced otherwise.

Such juices are not really "dried hard" by spraying or by intermixture of moisture absorbents, but are soft and in condition to re-absorb moisture readily. Under this invention the juice of a whole orange may be reduced to a small tablet that is hard and moisture resistant but yet retains the flavor and the food qualities of the original orange.

An object of this invention is to obtain vegetable juices and fruit juices as a hard product, but to preserve therein the particular flavor as well as the alkaline value and the vitamin content of the juice.

A further object is to augment certain friut or vegetable juices that are somewhat insipid of themselves by adding juices that do have marked flavor of their own and to prepare from that mixture a hard tablet that contains the nourishing qualities of both sources.

A specific purpose with which this invention is associated is to obtain a tablet of fruit juice that is hard rather than spongy or sticky. Other purposes and benefits of this invention will become apparent as illustrative description proceeds.

Many benefits of this invention arise from treating the juice so that the product ultimately will be hard, then dehydrating the juice to an intermediate degree, then adjusting the concentrate in its acid content, and completing concentration until a really hard tablet is obtained. Preferably the juice after its adjustments is concentrated unil is ratio of solids is equivalent to about 98° Brix. Various modifications will be apparent to those skilled in the art.

Juice reamed from tree-ripened oranges high in vitamin C was treated while fresh with pectase, an enzyme to deteriorate pectous bodies. Suitable conditions for the use of pectase are known to those skilled in the art. One particular pectase preparation that is suitable for this step of the invention is known commercially as "Pectinol A." Then this altered juice is dehydrated to an intermediate degree or until the Brix reading is about 70°. Then acid neutralizer may be added. Calcium hydroxide is preferred as neutralizing agent. The exact degree of neutralization at this point is difficult to define, but may be guided to obtain a pleasing taste in the hard product but insufficient for the product to be chemically or physically unstable. Then dehydration proceeds further under vacuum until the Brix reading is about 98°. During these latter stages the products of enzyme degradation of the pectous bodies preferably remain in the juice.

The degree of vacuum applied during concentration preferably is as high as is necessary to prevent deterioration of ingredients affected by heat. About 29 inches is satisfactory, with reference to a 30 inch barometer. The final product however is held under vacuum at elevated temperature, preferably about 150 to 155° F., for about 30 minutes after water ceases appearing at the mouth of the condenser, or until moisture content is less than about 2 percent. It is preferred that initially the juice be dehydrated under high vacuum corresponding to boiling temperatures below 100° F. As dehydration proceeds however the boiling point of the altered juice rises under vacuum to about 150 to 155° F. The product is sufficiently fluid at the temperature of completion to be cast into tablets and when cooled is hard and brittle rather than gummy or fluid. When this hot concentrated product is poured the surface quickly sets and acts to protect inner portions of the cooling solid or tablet.

It will be observed that the equipment useful for this treatment may be exceedingly simple, and evaporator adapted to permit treatment of the pectous bodies and then neutralization after partial concentration of the degraded or "cracked" juice. The equipment must be such as to undergo vacuum treatment without entrainment losses of the product, particularly as the liquid under treatment contains preferably the products resulting from degrading the pectous content and also contains the natural minerals of the juice. However vacuum equipment is not entirely essential for all juices nor essential in the event that some degree of caramelization is desirable or for other reasons. However it is preferred for citrus juices and for many other juices.

While concentration of solids in the final citrus product to about 98° Brix has been indicated as preferable, the concentration may be higher than this if desired. However, such a concentration as 98° Brix is equivalent to substantially complete dehydration. The temperature equivalent of 98° Brix or slightly higher during the dehydration treatment does not impair the vitamin C potency of the final tablets. Fresh juice containing 48 milligrams vitamin C per hundred grams resulted in a vitamin C content of 400 milligrams per hundred grams in the hard product. This vitamin retention appears to be associated with the heavy or agglomerated substances that result from precipitating or from degrading the pectous bodies in the juice.

The tablets contain about 5 to 8 percent, preferably about 5 percent citric acid, but apparently this does not interfere with their hard consistency. Furthermore, the medium that is formed under this invention is brought into final hardened condition despite natural sugars and such calcium compounds as are present where calcium is the neutralizing agent, and despite degraded pectous bodies. There is evidence that action involving the sugars present aids in effecting the final high vitamin C content.

Though this invention has been described with reference to citrus juices this invention may be applied to other juices. For example, carrot juice or celery juice are illustrative of vegetable juices that may be brought into the form of a hard tablet by this invention. It may be desirable in some instances to mix celery juice and orange juice for example to obtain the benefits of these juices during this treatment. In some instances to vegetable juices or to fruit juices that are low in acid citric acid may be added to promote hardening of the product.

The variation of this invention is illustrated by treatment of prunes. Prunes may be leeched preferably with water and the resulting liquid treated according to the description already given. This illustrates use of extracts from vegetable substances though the extract may not necessarily be termed "juice." A similar illustration is obtained in mashing citrus peel, the extracting of the peel preferably with water to obtain a high concentration of vitamin A and of other valuable ingredients of the peel. This may be formed into a hard tablet either alone or with other juices according to the description given.

Another illustration relates to a tablet containing condensed turnip juice, because turnip juice preservation has been considered not feasible commercially. Turnip juice was mixed with some grapefruit juice so that the mixture contained about 25 percent grapefruit juice. This mixture was then treated with the "Pectinol A" and also treated with diastase and then treated in the evaporator similarly to orange juice hereinbefore described. After dehydration of this mixture it was found that the vitamin C concentration in the hard tablets had been maintained as in the orange mixture.

In some instances pectous bodies may be removed from their natural colloidal condition by application of other agents than pectinase. Thus addition of alcohol may be effective for this purpose where the alcohol causes at least incipient precipitation of the pectous bodies.

The hard tablet described herein is resistant to moisture absorption, but dissolves in water.

While I have in the above description disclosed what I believe to be a preferred and practical embodiment of the invention, it will be understood to those skilled in the art that the specific details of the process as described are subject to some latitude of variation, without transcending the spirit and scope of the appended claims.

What I claim is:

1. Process of preparing a hard tablet from the expressed juices selected from the group consisting of fruit and vegetable juices and mixtures thereof, which comprises degrading pectins therein, partially concentrating the juice, adjusting the acidity thereof, and completing the concentration of the treated juice until a dehydrated product consisting of a hard material at room temperature is obtained.

2. Process of preparing a hard substantially dehydrated edible material from expressed juices chosen from the group consisting of fruit and vegetable juices and mixtures thereof, which comprises the steps of treating the juice by adding enzymes thereto to degrade the pectins therein, and then subjecting said treated juice to dehydration until a dehydrated product consisting of a material of brittle hardness at room temperature is obtained.

3. Process of preparing a concentrated product from the expressed juices selected from the group consisting of fruit and vegetable juices and mixtures thereof which comprises degrading the pectin therein to facilitate the release of water from the juice solids in the final stage of high concentration, then subjecting said treated juice to dehydration until a product of desired high concentration is produced.

4. A brittle hard solid form of concentrate of the solids of fruit and vegetable juices and mixture of the same consisting solely of the natural juice solids in the same proportions in which they are present in the natural juice, the pectin content of the natural juice being present in degraded form.

5. A brittle hard solid form of concentrate of the solids of citrus fruit juice and mixtures of such juices consisting solely of the natural juice solids in the same proportions in which they are present in the natural juice, and vitamin C in substantially the same proportion in which it is present in the natural juice, the pectin content of the natural juice being present in degraded form.

JOHN A. BRUCE.